(12) United States Patent
Oh et al.

(10) Patent No.: US 10,331,172 B2
(45) Date of Patent: Jun. 25, 2019

(54) FLEXIBLE WINDOW SUBSTRATE AND FLEXIBLE DISPLAY DEVICE HAVING THE SAME

(71) Applicant: Samsung Display Co., Ltd., Yongin-si, Gyeonggi-do (KR)

(72) Inventors: Hye-Jin Oh, Asan-si (KR); Sang-Il Park, Yongin-si (KR); Hyun Joon Oh, Seongnam-si (KR); Jeoung Sub Lee, Seoul (KR); Min-Hoon Choi, Seoul (KR); In Sun Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 29 days.

(21) Appl. No.: 14/983,421

(22) Filed: Dec. 29, 2015

(65) Prior Publication Data
US 2016/0320803 A1 Nov. 3, 2016

(30) Foreign Application Priority Data

Apr. 30, 2015 (KR) .......................... 10-2015-0062087

(51) Int. Cl.
*G06F 1/16* (2006.01)
*B32B 7/02* (2006.01)
(Continued)

(52) U.S. Cl.
CPC ............ *G06F 1/1652* (2013.01); *B32B 3/085* (2013.01); *B32B 3/16* (2013.01); *B32B 3/30* (2013.01);
(Continued)

(58) Field of Classification Search
CPC ................. G06F 1/1652; G06F 3/0412; G06F 2203/04103; G06F 2203/04102;
(Continued)

(56) References Cited

U.S. PATENT DOCUMENTS

| 5,988,503 A | 11/1999 | Kuo | |
|---|---|---|---|
| 6,403,223 B1 * | 6/2002 | Albro | ...................... B32B 27/08 |
| | | | 359/488.01 |

(Continued)

FOREIGN PATENT DOCUMENTS

| JP | 2002-94203 A | 3/2002 |
|---|---|---|
| JP | 2004-196008 A | 7/2004 |

(Continued)

OTHER PUBLICATIONS

"iTouch Stylus Pen series 2012 DM", HuntWave Industrial Co., Ltd. (Nov. 25, 2013); <http://www.huntwave.com/products/as801.html>.*

(Continued)

*Primary Examiner* — David Sample
*Assistant Examiner* — Donald M Flores, Jr.
(74) *Attorney, Agent, or Firm* — Lewis Roca Rothgerber Christie LLP

(57) ABSTRACT

There is provided a flexible display device including a display panel for displaying an image, and a window substrate covering the touch screen panel, the widow substrate including a flexible base layer including an externally facing first surface, and a second surface opposite the first surface and facing the display panel, a hard coating layer having a hardness that is larger than that of the base layer, and including a plurality of coating tiles on the first surface of the base layer that are spaced to have a gap between adjacent ones of the coating tiles, and a self-healing coating layer including a self-healing material and covering the hard coating layer on the base layer.

26 Claims, 8 Drawing Sheets

(51) Int. Cl.
  *B32B 3/16* (2006.01)
  *G06F 3/041* (2006.01)
  *G06F 3/0354* (2013.01)
  *B32B 7/12* (2006.01)
  *B32B 27/08* (2006.01)
  *B32B 27/28* (2006.01)
  *B32B 27/36* (2006.01)
  *B32B 3/08* (2006.01)
  *B32B 3/30* (2006.01)

(52) U.S. Cl.
  CPC ............. *B32B 7/02* (2013.01); *B32B 7/12* (2013.01); *B32B 27/08* (2013.01); *B32B 27/281* (2013.01); *B32B 27/36* (2013.01); *G06F 3/0412* (2013.01); *B32B 2255/00* (2013.01); *B32B 2255/10* (2013.01); *B32B 2255/26* (2013.01); *B32B 2255/28* (2013.01); *B32B 2307/412* (2013.01); *B32B 2307/42* (2013.01); *B32B 2307/536* (2013.01); *B32B 2307/54* (2013.01); *B32B 2307/546* (2013.01); *B32B 2307/762* (2013.01); *B32B 2457/20* (2013.01); *G06F 2203/04102* (2013.01); *G06F 2203/04103* (2013.01)

(58) Field of Classification Search
  CPC . G06F 2203/04809; B32B 3/30; B32B 27/08; B32B 27/281; B32B 27/36; B32B 7/12; B32B 3/085; B32B 7/02; B32B 3/16; B32B 2255/28; B32B 2255/10; B32B 2307/546; B32B 2307/54; B32B 2307/536; B32B 2307/42; B32B 2307/762; B32B 2255/26; B32B 2255/00; B32B 2457/20; B32B 2307/412; B32B 25/20; B32B 25/08; B32B 27/302; B32B 27/34; B32B 27/365; B32B 2307/51; B32B 2457/202; B32B 2457/208; B32B 2457/00; Y10T 428/24983
  See application file for complete search history.

(56) References Cited

U.S. PATENT DOCUMENTS

| | | | |
|---|---|---|---|
| 8,025,958 B2 | 9/2011 | Yamamoto et al. | |
| 8,199,471 B2 | 6/2012 | Bemelmans et al. | |
| 8,223,130 B2 * | 7/2012 | Takashima | G06F 3/041 345/173 |
| 9,213,929 B2 | 12/2015 | Tazaki et al. | |
| 9,411,377 B2 | 8/2016 | Park et al. | |
| 9,519,083 B2 | 12/2016 | Park et al. | |
| 9,619,059 B2 | 4/2017 | Park et al. | |
| 2003/0060569 A1 | 3/2003 | White et al. | |
| 2005/0053768 A1 | 3/2005 | Friedman et al. | |
| 2007/0052670 A1 | 3/2007 | Lee et al. | |
| 2007/0252825 A1 | 11/2007 | Nashiki et al. | |
| 2009/0004478 A1 | 1/2009 | Baetzold et al. | |
| 2009/0247694 A1 * | 10/2009 | Kritzer | B29C 73/163 524/556 |
| 2010/0026662 A1 | 2/2010 | Oohira | |
| 2010/0162824 A1 | 7/2010 | Jamshidi et al. | |
| 2010/0201603 A1 | 8/2010 | Kee et al. | |
| 2010/0309160 A1 | 12/2010 | Lin | |
| 2011/0025640 A1 | 2/2011 | Lin et al. | |
| 2011/0032704 A1 | 2/2011 | Oh et al. | |
| 2011/0241051 A1 | 10/2011 | Carter et al. | |
| 2011/0248938 A1 | 10/2011 | Kwak et al. | |
| 2011/0304578 A1 | 12/2011 | Kim et al. | |
| 2012/0014082 A1 * | 1/2012 | Naksen | G06F 1/1624 361/807 |
| 2012/0081331 A1 | 4/2012 | Chae et al. | |
| 2012/0138970 A1 | 6/2012 | Shim et al. | |
| 2012/0147599 A1 | 6/2012 | Shim et al. | |
| 2012/0192466 A1 | 8/2012 | Kee et al. | |
| 2013/0002569 A1 | 1/2013 | Kang et al. | |
| 2013/0034685 A1 | 2/2013 | An et al. | |
| 2013/0177748 A1 | 7/2013 | Hirai et al. | |
| 2013/0208196 A1 | 8/2013 | Kim et al. | |
| 2013/0300678 A1 | 11/2013 | Kang et al. | |
| 2014/0198266 A1 | 7/2014 | Park et al. | |
| 2014/0218408 A1 | 8/2014 | Kwon et al. | |
| 2014/0253826 A1 | 9/2014 | He | |
| 2015/0062456 A1 | 3/2015 | Miyazaki et al. | |
| 2015/0064422 A1 | 3/2015 | Choiniere et al. | |
| 2015/0192986 A1 | 7/2015 | Yang | |
| 2015/0212547 A1 | 7/2015 | Park et al. | |
| 2016/0077553 A1 | 3/2016 | Hyun | |
| 2016/0124536 A1 | 5/2016 | Hyun et al. | |
| 2016/0188098 A1 | 6/2016 | Her et al. | |
| 2016/0221294 A1 | 8/2016 | Choi et al. | |
| 2016/0224068 A1 | 8/2016 | Choi et al. | |
| 2016/0320803 A1 | 11/2016 | Oh et al. | |
| 2018/0024592 A1 | 1/2018 | Lim et al. | |

FOREIGN PATENT DOCUMENTS

| | | | |
|---|---|---|---|
| JP | 5008049 B2 | 8/2012 | |
| JP | 2012-252224 A | 12/2012 | |
| JP | 2013-45823 A | 3/2013 | |
| KR | 10-0550377 | 2/2006 | |
| KR | 10-2006-0114443 | 11/2006 | |
| KR | 10-2007-0003295 | 1/2007 | |
| KR | 10-2007-0094184 | 9/2007 | |
| KR | 10-2008-0062355 | 7/2008 | |
| KR | 10-2008-0088767 | 10/2008 | |
| KR | 10-2010-0077799 | 7/2010 | |
| KR | 10-2010-0135089 A | 12/2010 | |
| KR | 10-2011-0062523 | 6/2011 | |
| KR | 10-2011-0105751 A | 9/2011 | |
| KR | 10-2011-0128533 | 11/2011 | |
| KR | 10-1113661 | 2/2012 | |
| KR | 10-2012-0063748 | 6/2012 | |
| KR | 10-2012-0118856 | 10/2012 | |
| KR | 10-2013-0015230 | 2/2013 | |
| KR | 10-2013-0022649 | 3/2013 | |
| KR | 10-2013-0103158 | 9/2013 | |
| KR | 10-2013-0135153 | 12/2013 | |
| KR | 10-2014-0011809 | 1/2014 | |
| KR | 10-2014-0026197 | 3/2014 | |
| KR | 10-2014-0058762 | 5/2014 | |
| KR | 10-2015-0089788 A * | 8/2015 | ............... G09F 9/00 |

OTHER PUBLICATIONS

Park et al. (KR10-2015-0089788A) (Aug. 5, 2015) (KIPRIS machine translation to English).*
Blaiszik, B.J. et al., "Self-Healing Polymers and Composites," Annual Review of Materials Research 2010, vol. 40, pp. 179-211.
Hastrich, Carl, "Bouncing Ideas, emerging design ideas of biomimicry, critical creativity, sustainability and strategic thinking, Self Healing Materials," Filed under: Materials Research, Posted: Feb. 1, 2012, http://bouncingideas.wordpress.com/2012/02/01/self-healing-materials/, 8 pages.
Toohey et al., "Self-healing materials with microvascular networks," Nature Materials, Jun. 10, 2007, pp. 1-5.
EPO Extended Search Report dated Jun. 17, 2016, of the corresponding European Patent Application No. 16150398.2 (8 pages).
U.S. Office Action dated Nov. 4, 2015, issued in U.S. Appl. No. 14/528,377 (16 pages).
U.S. Notice of Allowance dated Apr. 1, 2016, issued in U.S. Appl. No. 14/332,339 (9 pages).
U.S. Notice of Allowance dated Dec. 2, 2016, issued in U.S. Appl. No. 14/936,710 (8 pages).
U.S. Office Action dated Aug. 15, 2017, issued in U.S. Appl. No. 14/868,220 (15 pages).
U.S. Office Action dated Dec. 4, 2017, issued in U.S. Appl. No. 14/822,774 (16 pages).

(56) References Cited

OTHER PUBLICATIONS

Singh et al., "Indium Tin Oxide (ITO) films on flexible substrates for organic light emitting diodes," Proc. of ASID '06, Oct. 8-12, 2006, New Delhi, pp. 388-391.
Xiao et al, "Selective Patterning of ITO on flexible PET Substrate by 1064nm picosecond Laser," Physics Procedia 12 (2011), pp. 125-132, 2011.
U.S. Notice of Allowance dated May 4, 2018, issued in U.S. Appl. No. 14/868,220 (9 pages).
U.S. Final Office Action dated Jun. 15, 2018, issued in U.S. Appl. No. 14/822,774 (20 pages).
U.S. Office Action dated Jan. 2, 2019, issued in U.S. Appl. No. 14/822,774 (15 pages).

* cited by examiner

FLEXIBLE WINDOW SUBSTRATE AND FLEXIBLE DISPLAY DEVICE HAVING THE SAME

CROSS-REFERENCE TO RELATED APPLICATION

This application claims priority to and the benefit of Korean Patent Application No. 10-2015-0062087 filed in the Korean Intellectual Property Office on Apr. 30, 2015, the entire contents of which are incorporated herein by reference.

BACKGROUND

1. Field

The described embodiments relate generally to a display device, and more particularly, to a flexible window substrate capable of being bent, or expanded and contracted, by an external force, and a flexible display device having the same.

2. Description of the Related Art

A display device is a device that visually displays data. Generally, the display device, which is generally used as one of the output devices of a computer, is a device that displays results on a screen so that a user is able to directly see the results processed by the computer with their eyes. A kind of display device includes a cathode ray tube (CRT), a liquid crystal display (LCD), an organic light emitting diode display (OLED), an electrophoretic display (EPD), and the like. As display devices have evolved, the display device is not limited to function as an output device of the computer, but has also been variously applied to a television receiver, portable communication devices, wearable electrode devices, and the like.

Among the display devices, a liquid crystal display, an organic light emitting diode display, an electrophoretic display, and the like, which may be manufactured with a module having a flat panel shape, may easily implement a large, thin, and light display device, and as a result, these displays have taken the lead in the display industry. Further, a flexible display device that may be bent, rolled, or stretched as a whole by adopting a flexible or stretchable material as a material of a substrate has been developed.

Meanwhile, a touch screen panel has been developed as an input scheme, which may replace other input schemes, such as a mouse and a keyboard, so as to directly input information to a screen using a hand or a pen. Any user may directly perform their desired works/inputs while seeing a screen of the touch screen panel and operating the touch screen panel. Accordingly, the touch screen panel has been evaluated as a useful input scheme under the graphical user interface (GUI) environment, and is currently widely used in various fields, such as a control screen of mobile phones, tablet computers, various kinds of medical equipment, and an information display for guiding a bank, a government office, a tourist, and main institutions. The touch screen panel is used by being combined with a flat panel display, such as a liquid crystal display, an organic light emitting diode display, or a flexible display device.

Although the touch screen panel is applied to the flexible display device, a window layer at an outermost side of the flexible display device has flexible characteristics, and therefore, a surface of the window layer may be more easily damaged by a contact of a hand or a touch pen due to the window layer's characteristics. However, when the window layer is made of a rigid material to reduce or prevent damage to the surface of the window layer, the flexibility of the display device may decrease.

The above information disclosed in this Background section is only for enhancement of understanding of the background of the described technology and therefore it may contain information that does not form the prior art that is already known in this country to a person of ordinary skill in the art.

SUMMARY

The described technology provides a flexible display device capable of simultaneously implementing flexibility and high hardness characteristics by forming a plurality of independently segmented coating layers of a high hardness material on a window substrate of a flexible material, and by covering the coating layer with a self-healing material.

Further, embodiments of the present invention provide a flexible window substrate having a plurality of independently segmented coating layers of a high hardness material, and a self-healing coating layer covering the coating layer formed on a surface thereof.

An exemplary embodiment provides a flexible display device including a display panel for displaying an image, and a window substrate covering the display panel, the widow substrate including a flexible base layer including an externally facing first surface, and a second surface opposite the first surface and facing the display panel, a hard coating layer having a hardness that is larger than that of the base layer, and including a plurality of coating tiles on the first surface of the base layer that are spaced to have a gap between adjacent ones of the coating tiles, and a self-healing coating layer including a self-healing material and covering the hard coating layer on the base layer.

The flexible display device may further comprise a touch screen panel on the display panel.

The flexible display device may further comprise a touch screen panel in the display panel.

The coating tiles may be isolated from each other.

The plurality of coating tiles may be arranged in a matrix form.

The self-healing coating layer may include elastomer including any one of silicones, urethanes, or urethane acrylates.

The self-healing coating layer may include a self-healing elastomer using hydrogen bonding or Diels-Alder reaction.

The self-healing coating layer may be patterned to individually cover each of the coating tiles.

The base layer may include protrusions patterned to correspond to respective ones of the coating tiles.

The self-healing coating layer may be formed to individually coat the protrusions on which the coating tiles are coated.

The window substrate may correspond to a display area for displaying an image, and a non-display area that encloses the display area, and the hard coating layer may be at an area corresponding to the display area.

A thickness of the coating tiles may range from about 10 μm to about 100 μm.

A thickness of the self-healing coating layer ranges from about 20 μm to about 50 μm.

A curvature radius of a tip of a touch pen for touching a surface of the window substrate may be r, a thickness of the coating tiles may be d, and a maximum gap between adjacent ones of the coating tiles may be S, and may satisfy the following equation:

$$S \leq 2\sqrt{d(2r-d)}$$

The gap between the adjacent ones of the coating tiles may range from about 20 μm to about 200 μm.

The coating tiles may have a circular or polygonal plane shape.

The base layer may include a material selected from at least one of elastomer, polyethylene terephthalate (PET), polyethylene naphthalate (PEN), polyimide (PI), polymethyl methacrylate (PMMA), silicone, or polyurethane (PU).

The coating tiles may include a material selected from at least one of epoxy, acryl, silicone, or polyurethane (PU).

Another exemplary embodiment of the present invention provides a flexible window substrate, including a flexible base layer including an externally facing first surface, and a second surface opposite the first surface, a hard coating layer having a hardness that is larger than that of the base layer, and including a plurality of coating tiles on the first surface of the base layer that are spaced from each to have a gap between adjacent ones of the coating tiles, and a self-healing coating layer including a self-healing material and covering the hard coating layer on the base layer.

The coating tiles may be isolated from each other.

The coating tiles may be arranged in a matrix form.

The self-healing coating layer may include elastomer including at least one of silicones, urethanes, or urethane acrylates.

The self-healing coating layer may include a self-healing elastomer using hydrogen bonding or Diels-Alder reaction.

The self-healing coating layer may be patterned to individually cover each of the coating tiles.

The base layer may include protrusions patterned to correspond to respective ones of the coating tiles of the hard coating layer.

The self-healing coating layer individually coats the protrusions of the base layer on which the coating tiles are coated.

In accordance with the flexible display device according to an exemplary embodiment, it is possible to simultaneously implement the flexibility and high hardness characteristics by forming the plurality of independently segmented coating layers of the high hardness material on the window substrate of the flexible material.

Further, it is possible to reduce/minimize or prevent the damage to the coating layer having the high hardness by imparting the healing force to the portion of the coating layer having the high hardness, which may be damaged due to the external impact, by covering the segmented hard coating layer having the high hardness with the self-healing coating layer having the self-healing force and the elasticity to protect the hard coating layer.

DETAILED DESCRIPTION

Figure 1:
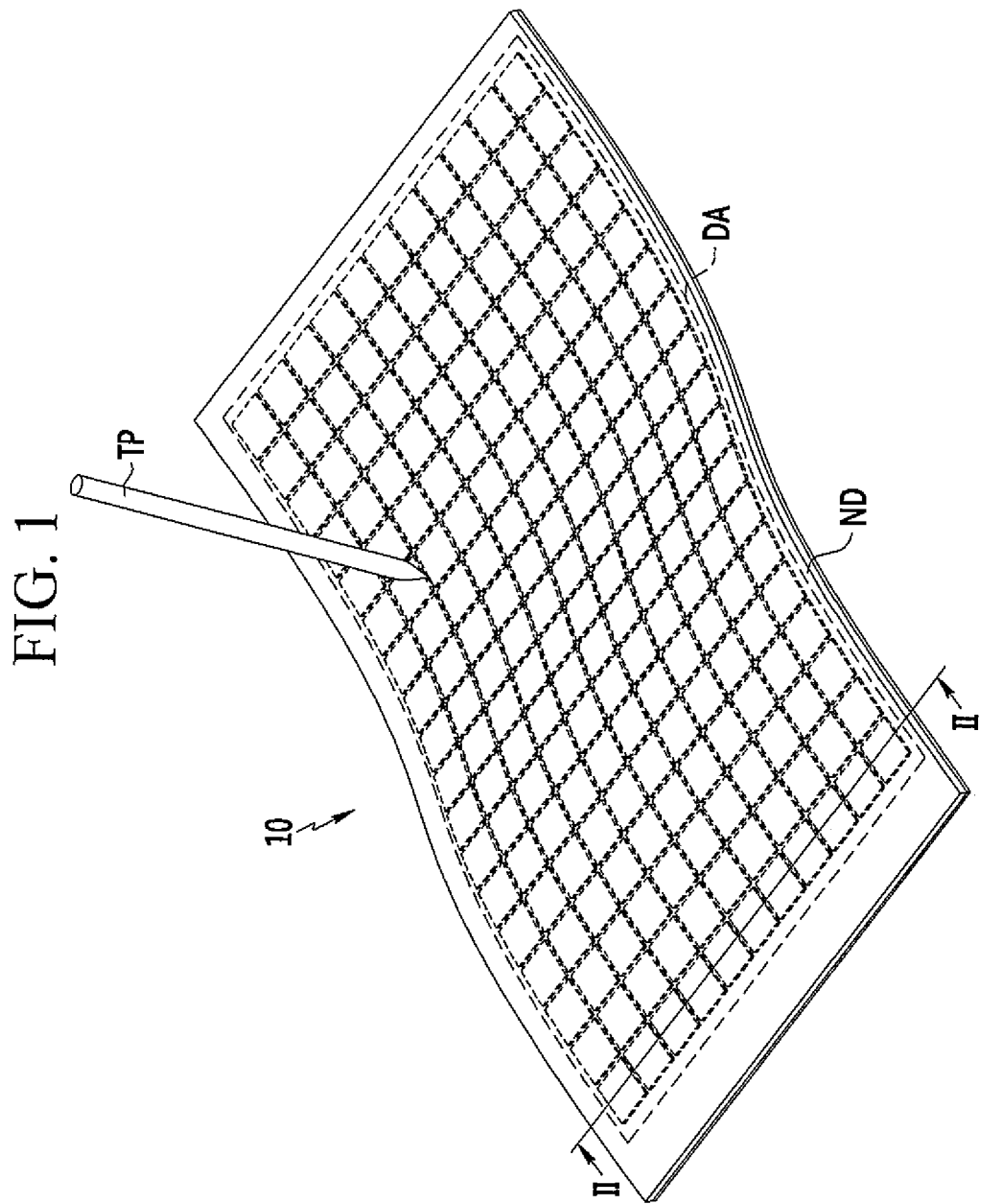
FIG. 1 is a perspective view illustrating a flexible display device according to an exemplary embodiment.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a flexible display device according to an exemplary embodiment will be described in detail with the accompanying drawings.

Figure 2:
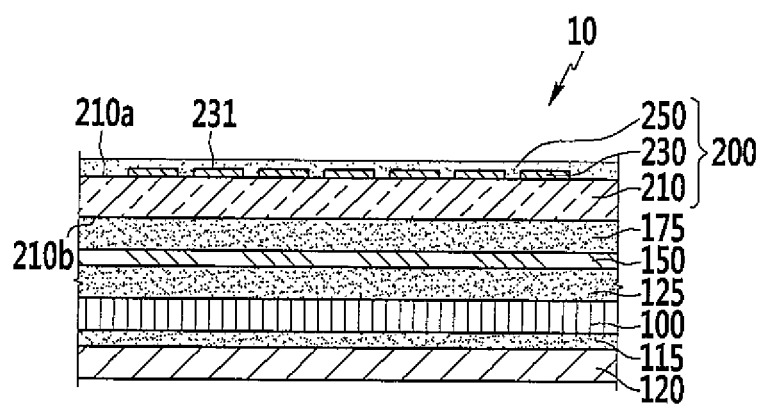
FIG. 2 is a partial cross-sectional view taken along the line II-II of FIG. 1.

FIG. 1 is a perspective view illustrating a flexible display device according to an exemplary embodiment, and FIG. 2 is a partial cross-sectional view taken along the line II-II of FIG. 1.

Referring to FIG. 1, a flexible display device 10 according to an exemplary embodiment has a structure in which a display panel and a touch screen panel are protected by being covered with a window substrate, and the flexible display device 10 may be divided into a display area DA for producing an image, and a non-display area ND having a driving circuit unit, a frame, and the like positioned therein. However, the non-display area ND may be reduced or minimized, or might not be exposed to a front surface by changing a position of the driving circuit unit, or by changing a shape of a frame depending on a design of the display device 10.

The window substrate 200 includes a base layer 210 made of a flexible material, and a hard coating layer 230 in which a plurality of coating tiles 231 are arranged on, and attached to, an externally/outwardly facing surface of the base layer 210 at intervals from each other. A self-healing coating layer 250 is formed on the base layer 210 to cover the hard coating layer 230. The self-healing coating layer 250 may be made of a self-healing material, and may have an elastic coefficient that is larger than that of the hard coating layer 230.

For an input of the display screen, the touch pen TP may be used by contacting a surface of the window substrate 200. Therefore, the hard coating layer 230 is formed by attaching a plurality of coating tiles 231 to the base layer 210 of the window substrate 200 corresponding to at least the display area DA, and the coating tiles 231 may be made of a material having hardness higher than that of the base layer 210. Further, the self-healing coating layer 250 is formed on the base layer 210 to cover the hard coating layer 230, and may protect the hard coating layer 230 from an external impact, such as that of a touch of a touch pen TP, or the like A cross section configuration of the flexible display device 10 according to an exemplary embodiment may be seen in greater detail in FIG. 2, in which the a touch screen panel 150 is attached to an upper portion of the display panel 100, and in which the window substrate 200 is attached to an upper portion of the touch screen panel 150 to cover the display panel 100 and the touch screen panel 150.

The display panel 100 includes a plurality of pixels that are arranged in a matrix form to display an image, and may be an organic light emitting display panel according to an exemplary embodiment. The display panel 100 may be formed on a flexible substrate to have flexible characteristics, and therefore may be configured of a curved panel, or of a bendable, foldable, rollable, or stretchable panel.

A lower protective film 120 is provided under the display panel 100 to protect the display panel 100

The lower protective film 120 may be formed of a flexible plastic film, for example, polyimide (PI) or polyethylene terephthalate (PET). A display panel adhesive layer 115 may be between the lower protective film 120 and the display panel 100 to attach the display panel 100 to the lower protective film 120. The display panel adhesive layer 115 may be made of an optically clear adhesive (OCA), and may be applied in an adhesive tape form, or may also be applied by applying and hardening an adhesive material.

An optical film may be attached on the display panel 100. As another example, the optical film may also be positioned on the touch screen panel 150. The optical film may include a polarization film and a phase difference film, in which the polarization film may polarize light incident on the display panel 100 and light obtained by reflecting the incident light from the display panel 100. Further, the phase difference film may be located more closely to the display panel 100 than the polarization film to effectively control a phase of the incident light and of the reflected light.

The touch screen panel is attached over the display panel 100. When the optical film is attached on the display panel 100, the touch screen panel 150 is positioned over the optical film, and a TSP adhesive layer 125 may be located between the display panel 100 and the touch screen panel 150 to attach the touch screen panel 150 to the display panel 100. The TSP adhesive layer 125 may be made of an optically clear adhesive (OCA), and may be applied in an adhesive tape form, or may also be applied by applying and hardening an adhesive material.

The touch screen panel 150 may sense the externally applied touch position, and the window substrate 200 is combined on the touch screen panel 150 to sense the touched position generated at the window substrate 200. According to the exemplary embodiment, the touch screen panel 150 may be formed of a panel that is driven with a capacitive type, but the present invention is not limited thereto. Accordingly, the touch screen panel 150 may also be formed of a panel which is driven with a resistive film type, an ultrasonic type, and an infrared type.

The window substrate 200 is formed to have an area that is larger than that of the display panel 100 and the touch screen panel 150, and is formed to cover the display panel 100 and the touch screen panel 150. A window adhesive layer 175 is interposed between the touch screen panel 150 and the window substrate 200 to attach the window substrate 200 to the touch screen panel 150. The window adhesive layer 175 may be made of an optically clear adhesive (OCA), and may be applied in an adhesive tape form, or may also be applied by applying and hardening an adhesive material.

According to the exemplary embodiment, the window substrate 200 includes the flexible base layer 210, which has an externally facing first surface 210a that is directed to the outside, and a second surface 210b facing the display panel 100 in an opposite direction to the first surface 210a. The window substrate 200 includes the hard coating layer 230, in which a plurality of coating tiles 231 are arranged on, and attached to, the first surface 210a of the base layer 210 at a gap from each other, and also includes the self-healing coating layer 250 formed on the first surface 210a of the base layer 210 to cover the coating tiles 231.

The coating tile 231 may be made of a material that has a hardness that is larger than that of the base layer 210, and the self-healing coating layer 250 may be made of the self-healing material and may have an elastic coefficient that is larger than that of the coating tile 231. According to the exemplary embodiment, the self-healing coating layer 250 is coated on the hard coating layer 230 so that an external surface is flat.

A thickness of the coating tile 231 may be formed to be in a range from about 10 μm to about 100 μm, and a thickness of the self-healing coating layer 250 may be formed to be in a range from about 20 μm to about 50 μm. The hardness of the self-healing coating layer 250 may be equal to or more than about 1H, but may also be equal to or more than about 3H.

For example, the base layer 210 may be made of a material selected from a group consisting of elastomer, polyethylene terephthalate (PET), polyethylene naphthalate (PEN), polyimide (PI), polymethyl methacrylate (PMMA), silicone, and/or polyurethane (PU). The coating tile 231 may be made of a material selected from a group consisting of epoxy, acryl, silicone, polyurethane (PU), grapheme, carbon nanotube (CNT), indium tin oxide (ITO), indium zinc oxide (IZO), Si, SiOx, and/or SiNx.

The self-healing material forming the self-healing coating layer 250 may include elastomer, which is any one of silicones, urethanes, urethane acrylates, and/or self-healing elastomer using hydrogen bonding or Diels-Alder reaction. The self-healing coating layer 250 including the self-healing material may cover damageable portions of the isolatedly formed coating tiles 231, for example, corner portions, or the like to protect the portions. The self-healing coating layer 250 may heal and may recover itself after being scratched due to an external impact.

For example, the self-healing material may be made of a self-healing polymer based on a reversible reaction. The self-healing polymer based on the reversible reaction includes a component that may be reversibly converted from a monomeric state to a cross-linking polymeric state when being applied with external energy. As a remendable self-healing material reaction scheme, a reaction scheme based on a Diels-Alder (DA) reaction and/or a retro-Diels-Alder (Rda) reaction may be applied.

Another example of the self-healing material may be a supramolecular self-healing material. A polymer designed to form a combination of a strong end-group and/or a side-group by multiple complementary, reversible hydrogen bonds may be polymerized as a self-healing elastomeric polymer.

Figure 3:
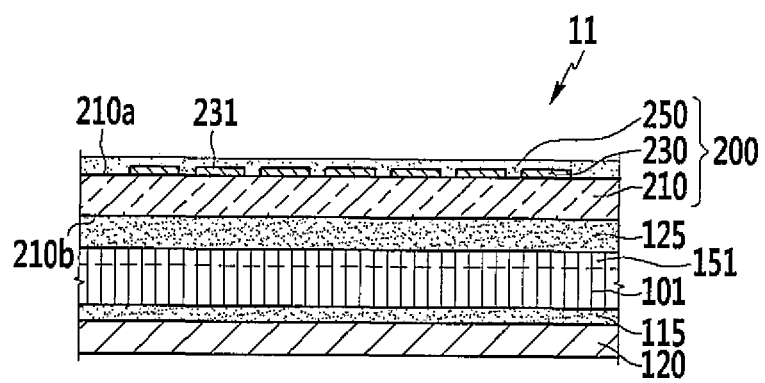
FIG. 3 is a partial cross-sectional view of a flexible display device according to another exemplary embodiment.

FIG. 3 is a partial cross-sectional view of a flexible display device according to another exemplary embodiment.

Referring to FIG. 3, a flexible display device 11 according to another exemplary embodiment may include a display panel 101 having a touch screen panel 151 therein. The window substrate 200 is disposed on the display panel 101 which includes the touch screen panel 151.

The window substrate 200 includes the flexible base layer 210, which has an externally facing first surface 210a that is directed to the outside, and a second surface 210b facing the display panel 101 in an opposite direction to the first surface 210a. The window substrate 200 includes the hard coating layer 230, in which a plurality of coating tiles 231 are arranged on, and attached to, the first surface 210a of the base layer 210 at a gap from each other, and also includes the self-healing coating layer 250 formed on the first surface 210a of the base layer 210 to cover the coating tiles 231.

Figure 4:
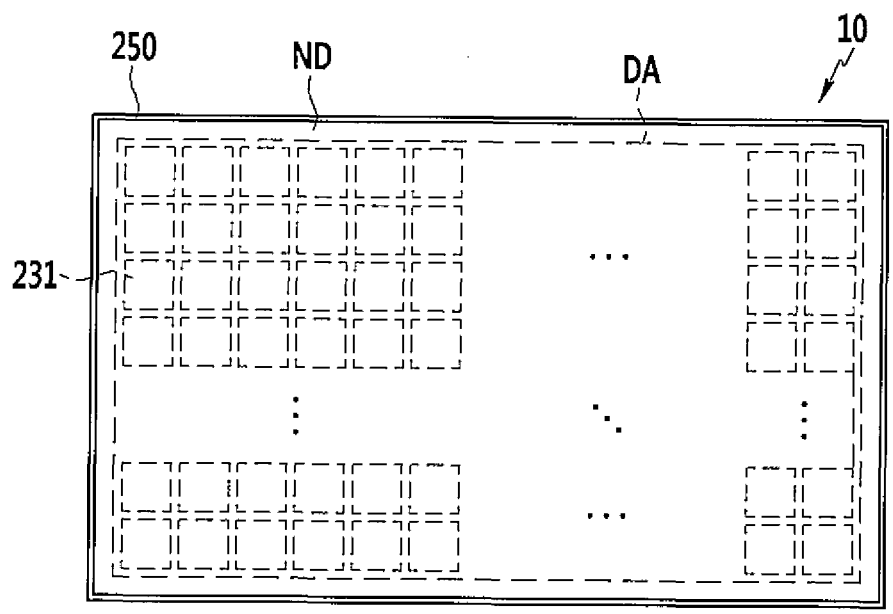
FIG. 4 is a plan view of a window substrate of the flexible display device according to the exemplary embodiment.

FIG. 4 is a plan view of a window substrate of the flexible display device according to the exemplary embodiment.

Referring to FIG. 4, the plurality of coating tiles 231 configuring the window substrate 200 of the flexible display device 10 are each formed to be isolated from each other while having the same plane shape, and are arranged in a matrix form. The window substrate 200 may be divided into a display area DA for displaying an image, and a non-display area ND enclosing the display area DA. The hard coating layer 230 configured of the coating tile 231 may be located in an area corresponding to the display area DA. The self-healing coating layer 250 including the self-healing material is formed to cover the coating tiles 231, and therefore may extend beyond an area in which the coating tiles 231 are arranged.

According to the exemplary embodiment, each coating tile 231 may have a square plane shape, and gaps formed between adjacent ones of the coating tiles 231 may be arranged to be uniform in all directions on a plane. The size of a gap between adjacent ones of the coating tiles may range from about 20 μm to about 200 μm.

The number of the coating tiles 231, and each area of the coating tile 231 included in the hard coating layer 230, may be determined and selected depending on a size and designed flexibility of the display device 10. Each coating tile 231 may be sized to correspond to at least one pixel, and/or may also be formed to have the same area in all the layers.

Figure 5:
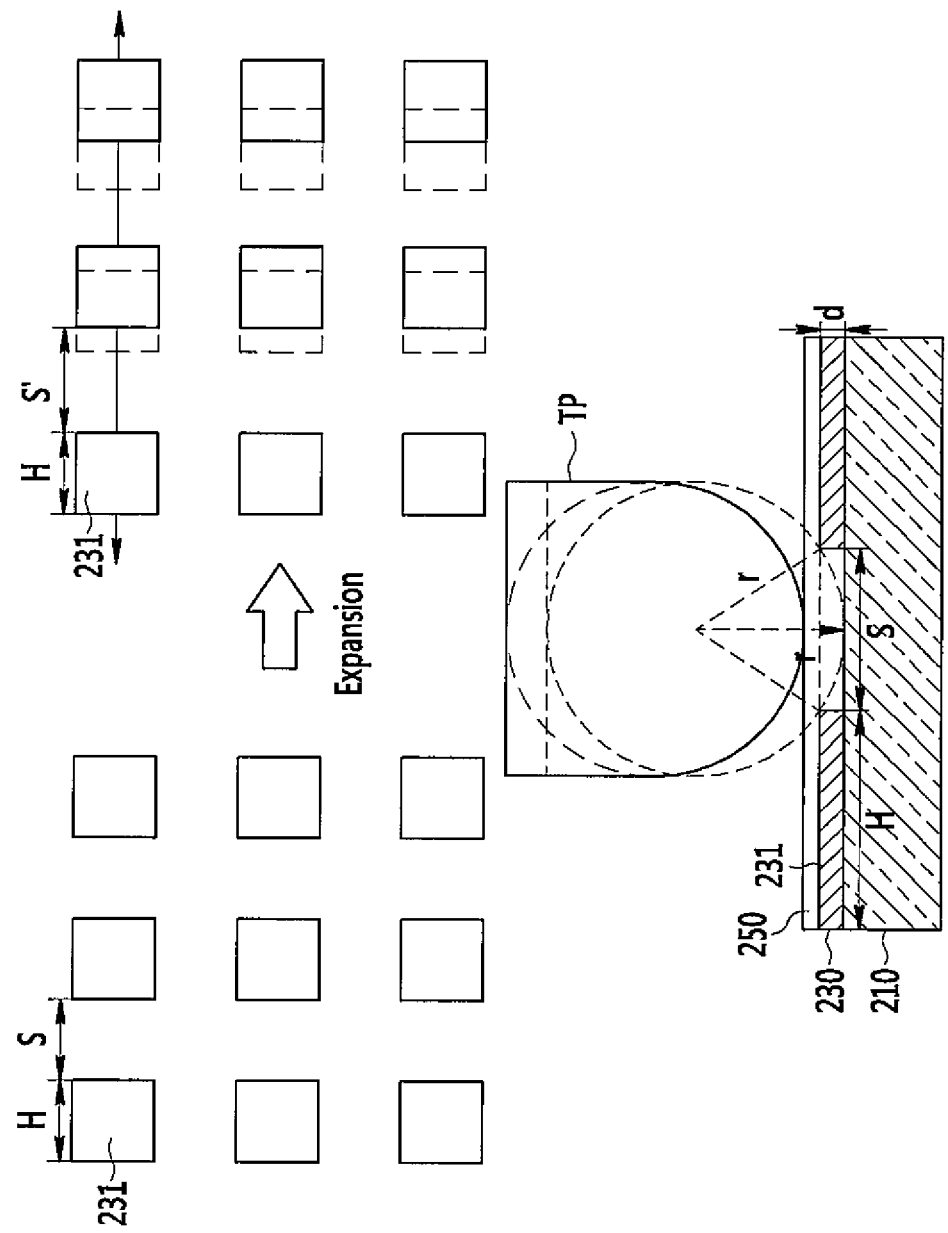
FIG. 5 is a diagram for describing a gap design condition of a coating tile formed on the window substrate of the flexible display device according to the exemplary embodiment.

FIG. 5 is a diagram for describing a gap design condition of a coating tile formed on the window substrate of the flexible display device according to the exemplary embodiment.

Referring to FIG. 5, when a curvature radius (e.g., radius of curvature) of a tip of touch pen TP that is used by contacting the surface of the window substrate 200 according to the exemplary embodiment is set to be a value of r, the thickness of the coating tile 231 formed on the hard coating layer 230 of the window substrate 200 is set to be a value of d, and the maximum gap between the coating tiles 231 adjacent each other is a value of S. For example, the maximum gap S may be formed to satisfy the following Equation 1.

$$S \leq 2\sqrt{d(2r-d)}$$ Equation 1

According to the exemplary embodiment, the self-healing coating layer 250 made of the self-healing material covers the coating tiles 231, but the self-healing coating layer 250 has the self-healing force, such that the gap between the coating tiles 231 may be designed in consideration of when a large amount of force is applied to the coating layer 250 by the touch pen TP.

The gap design process of the coating tile 231 will be described based on the above Equation 1.

First, when the thickness d of the coating tile 231 is set to be about 10 μm, the maximum gap S depending on the curvature radius r of the tip of the touch pen TP is shown in the Table 1.

TABLE 1

| | Curvature radius r of tip of touch pen [mm] | Maximum gap [μm] |
|---|---|---|
| Thickness of coating tile d = 10 μm | 0.01 | 20 |
| | 0.05 | 60 |
| | 0.1 | 87.2 |
| | 0.5 | 199.0 |
| | 0.7 | 235.8 |
| | 1.0 | 282.1 |

Next, if it is assumed that an elongation of the window substrate 200 is set to be 30% and 100%, the following Table 2 shows a pitch of the coating tiles 231, a width H of the coating tile 231, and gaps S and S' between the coating tiles 231 before the window substrate 200 is stretched, after the window substrate 200 is stretched by 30%, and after the window substrate 200 is stretched by 100% (e.g., when the window substrate 200 is fully stretched). The pitch of the coating tile 231 may be obtained by a summed value of the width H and the gaps S and S', wherein the maximum gap before the window substrate is stretched is set to be S, and wherein the maximum gap after the window substrate is stretched is set to be S'. Further, it is assumed that the width H and the maximum gap S of the coating tile 231 before the window substrate is stretched are designed to be the same.

TABLE 2

| Before stretched | | | After stretched by 30% | | | After fully stretched | | |
|---|---|---|---|---|---|---|---|---|
| Pitch [μm] | Width (H) [μm] | Gap (S) [μm] | Pitch [μm] | Width (H) [μm] | Gap (S') [μm] | pitch [μm] | Width (H) [μm] | Gap (S') [μm] |
| 350 | 175 | 175 | 455 | 175 | 280 | 700 | 175 | 525 |
| 300 | 150 | 150 | 390 | 150 | 240 | 600 | 150 | 450 |
| 250 | 125 | 125 | 325 | 125 | 200 | 500 | 125 | 375 |
| 200 | 100 | 100 | 260 | 100 | 160 | 400 | 100 | 300 |
| 150 | 75 | 75 | 195 | 75 | 120 | 300 | 75 | 225 |
| 100 | 50 | 50 | 130 | 50 | 80 | 200 | 50 | 150 |
| 50 | 25 | 25 | 65 | 25 | 40 | 100 | 25 | 75 |
| 10 | 5 | 5 | 13 | 5 | 8 | 20 | 5 | 15 |
| 5 | 2.5 | 2.5 | 6.5 | 2.5 | 4 | 10 | 2.5 | 7.5 |
| 1 | 0.5 | 0.5 | 1.3 | 0.5 | 0.8 | 2 | 0.5 | 1.5 |
| 0.5 | 0.25 | 0.25 | 0.65 | 0.25 | 0.4 | 1 | 0.25 | 0.75 |
| 0.1 | 0.05 | 0.05 | 0.13 | 0.05 | 0.08 | 0.2 | 0.05 | 0.15 |

For example, when the curvature radius r of the tip of the touch pen TP is set to be about 0.5 mm, and when the thickness d of the coating tile 231 is set to be about 10 μm, it may be appreciated from Table 1 that the allowed maximum gap S is about 199 μm. Referring to the above Table 2, the case in which the maximum gap S' is set to be about 200 μm as the maximum allowable value when the window substrate is stretched by 30%, and the case in which the gap S' is about 150 μm as the maximum allowable value when the window substrate is stretched by 100%.

Therefore, when the elongation of the window substrate 200 is about 30%, the width H (after stretching 30%) and the maximum gap S (before stretching) of the coating tile 231 may be set to be about 125 μm. Also, when the elongation of the window substrate 200 is 100%, the width H (after fully stretching 100%) and the maximum gap S (before stretching) of the coating tile 231 may be set to be 50 μm.

The above-mentioned design value is suggested for an exemplary description, and therefore the range of the present invention is not limited thereto.

Figure 6:
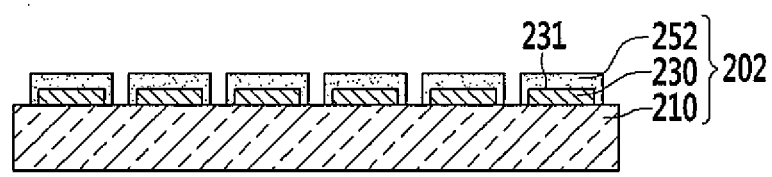
FIG. 6 is a cross-sectional view illustrating a coating layer pattern formed on a window substrate of a flexible display device according to another exemplary embodiment.

FIG. 6 is a cross-sectional view illustrating a coating layer pattern formed on a window substrate of a flexible display device according to another exemplary embodiment.

Referring to FIG. 6, the window substrate 202 according to the exemplary embodiment includes the hard coating layer 230, in which the plurality of coating tiles 231 are arranged on, and attached to, an externally facing surface of the base layer 210, and are arranged to be at a gap from each other. The hard coating layer 230 includes a self-healing coating layer 252 that is made of the self-healing material and that is formed to cover the coating tiles 231. According to the exemplary embodiment, the self-healing coating layer 252 has a structure to individually cover each coating tile 231, and a gap or a groove may be formed between adjacent portions of the self-healing coating layer 252 that cover respective ones of the coating tiles 231, depending on a size of the gap between adjacent coating tiles 231.

According to the window substrate 202 according to the exemplary embodiment, the self-healing coating layer 252 is also formed in an isolated pattern, thereby maintaining the effect of the hard coating layer 230 formed of the coating tiles 231 having high hardness, while imparting the general flexibility to the hard coating layer 230.

Figure 7:
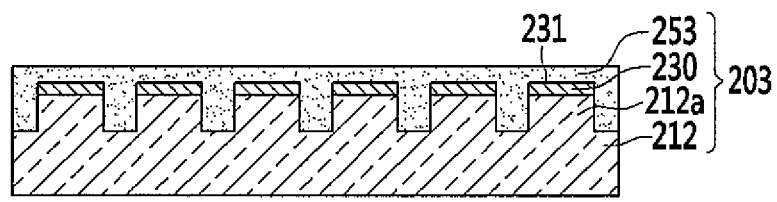
FIG. 7 is a cross-sectional view illustrating a coating layer pattern formed on a window substrate of a flexible display device according to still another exemplary embodiment.

FIG. 7 is a cross-sectional view illustrating the coating layer pattern formed on the window substrate of the flexible display device according to still another exemplary embodiment.

Referring to FIG. 7, the base layer 212 of the window substrate 203 according to the exemplary embodiment has a plurality of protrusions 212a that are patterned on an externally facing surface. The protrusions 212a of the base layer 212 are provided with the hard coating layer 230, with corresponding ones of the coating tiles 231 being coated thereon. The self-healing material is coated to simultaneously cover the protrusions 212a of the base layer 212 and the coating tiles 231, thereby forming the self-healing coating layer 253. According to the exemplary embodiment, the self-healing coating layer 253 is formed so that an external surface is flat.

Figure 8:
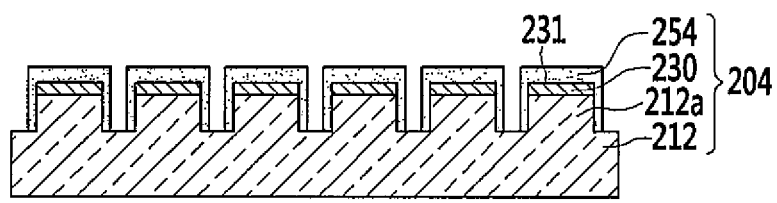
FIG. 8 is a cross-sectional view illustrating the coating layer pattern formed on the window substrate of the flexible display device according to still another exemplary embodiment.

FIG. 8 is a cross-sectional view illustrating the coating layer pattern formed on the window substrate of the flexible display device according to still another exemplary embodiment.

Referring to FIG. 8, the base layer 212 of the window substrate 204 according to the exemplary embodiment has the plurality of protrusions 212a that are patterned on an outwardly facing surface. The protrusions 212a of the base layer 212 are provided with the hard coating layer 230 thereon, with each of the coating tiles 231 being coated on respective ones of the protrusions 212a. The self-healing material is coated to simultaneously cover the protrusions 212a of the base layer 212, and the coating tiles 231, thereby forming the self-healing coating layer 254. According to the present exemplary embodiment, the self-healing coating layer 254 has a structure to individually cover each protrusion 212a and each coating tile 231, and a gap or a groove may be formed between adjacent portions of the self-healing coating layer 254 covering each of the coating tiles 231 and each of the protrusions 212a, depending on the gap between adjacent protrusions 212a and adjacent coating tiles 231.

Figure 9:
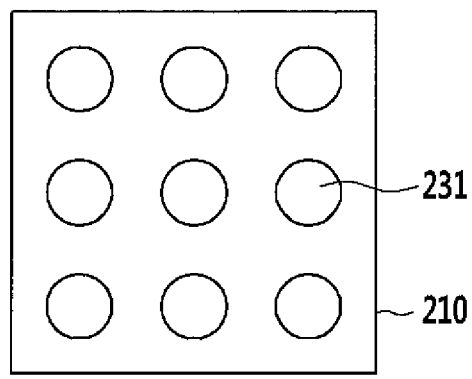
FIGS. 9 and 10 are plan views illustrating a hard coating layer pattern formed on a window substrate of a flexible display device according to still another exemplary embodiment.

FIGS. 8 and 9 are plan views illustrating a hard coating layer pattern formed on a window substrate of a flexible display device according to still another exemplary embodiment.

Figure 10:
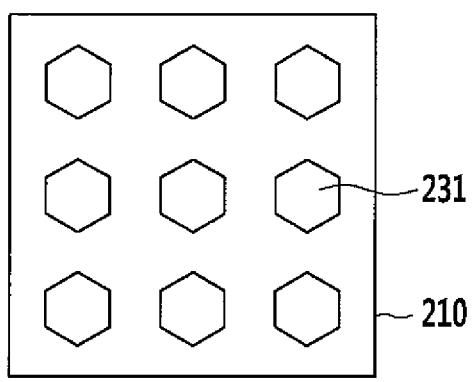

The coating tiles 231 of the hard coating layer 230 formed on the window substrate (e.g., window substrate 202, 203, 204) according to the exemplary embodiments of the present invention illustrated in FIGS. 5 to 7 may be patterned to have various shapes. For example, as illustrated in FIG. 9, the coating tile 231 may be formed to have a circular plane shape, and as illustrated in FIG. 10, the coating tile 231 may be formed to have a regular hexagonal plane shape. In addition, as illustrated in FIG. 3, the coating tile 231 may also be formed to have a squared plane shape. That is, the coating tile 231 of the hard coating layer 230 may be formed to have various plane shapes, including a circle and a polygon.

The plane shape of the protrusions 212a of the base layer 212 illustrated in FIGS. 6 and 7 may be formed to be identical with the plane shape of corresponding ones of the coating tiles 231. Therefore, the protrusions 212a of the base layer 212 may also be formed to have any one of the circular plane shape, the regular hexagonal plane shape, and the squared plane shape.

Further, as illustrated in FIG. 5, the self-healing coating layer 252 may be patterned to cover each coating tile 231, or as illustrated in FIG. 8, the self-healing coating layer 254 may be patterned to cover each coating tile 231 and to cover each protrusion 212a of the base layer 212. In this case, the plane shape of the self-healing coating layers 252 and 254 may correspond to the shape of the coating tile 231. Therefore, the plane shape of the separately/isolatedly formed self-healing coating layers 252 and 254 may be formed to have any one of the circular shape, the regular hexagonal shape, and the squared shape.

Figure 11:
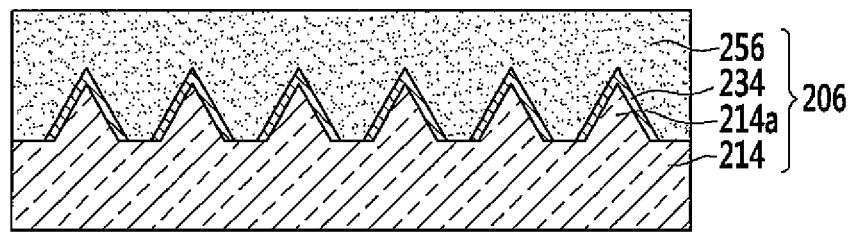
FIG. 11 is a cross-sectional view illustrating the coating layer pattern formed on the window substrate of the flexible display device according to still another exemplary embodiment.

FIG. 11 is a cross-sectional view illustrating the coating layer pattern formed on the window substrate of the flexible display device according to still another exemplary embodiment.

Referring to FIG. 11, an externally facing surface that is directed to an outside of a base layer 214 of a window substrate 206 according to the exemplary embodiment has a plurality of patterned protrusions 214a. The protrusions 214a of the base layer 214 are patterned to have a triangular cross section, and the coating tiles 231 having high hardness are each coated on respective ones of the protrusions 214a, thereby forming a hard coating layer 234. The self-healing material is coated to simultaneously cover the protrusions 214a and the coating tiles 231 of the base layer 214, thereby forming a self-healing coating layer 256. According to the exemplary embodiment, the self-healing coating layer 256 is formed so that the externally facing surface is flat. Furthermore, with respect to the protrusions 214a of the base layer 214 according to the exemplary embodiment, a tip portion of the protrusions 214a is flattened, thus the protrusions 214a may generally have a trapezoidal cross section shape.

Figure 12:
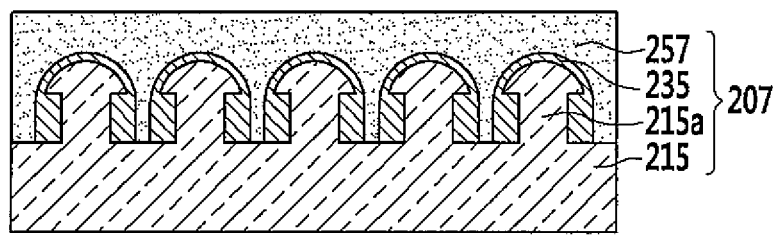
FIG. 12 is a cross-sectional view illustrating the coating layer pattern formed on the window substrate of the flexible display device according to still another exemplary embodiment.

FIG. 12 is a cross-sectional view illustrating the coating layer pattern formed on the window substrate of the flexible display device according to still another exemplary embodiment.

Referring to FIG. 12, according to the exemplary embodiment, an externally/upwardly facing surface, which is directed to outside of a base layer 215 of a window substrate 207, has a plurality of patterned protrusions 215a. The protrusions 215a of the base layer 215 are patterned to have a mushroom-shaped cross section, and the coating tiles having high hardness are each coated on respective ones of the protrusions 215a, thereby forming the hard coating layer 235. The self-healing material is coated to simultaneously cover the protrusions 215a and the coating tiles 231 of the base layer 215, thereby forming a self-healing coating layer 257. According to the exemplary embodiment, the self-healing coating layer 257 is formed so that the externally facing surface is flat.

In addition to the exemplary embodiments described with reference to the accompanying drawings, the cross section shape and the plane shape of the protrusion of the base layer may be formed to have various shapes, including a polygon and the plane shape of the coating tile having high hardness may be formed to have various shapes including a polygon and a circle.

When the self-healing coating layer is coated on the whole surface of the base layer of the window substrate, the self-healing materials may be coated on the coating tiles on the base layer by applying dip coating, bar coating, or slot-die coating processes thereto. When the self-healing coating layer is individually coated to each of the coating tiles on the base layer or is coated on the protrusions of the base layer on which the coating tiles are individually coated, the self-healing material is pattern-coated on the base layer by applying screen printing and inkjet printing processes. The so coated self-healing material is hardened by thermosetting or ultraviolet rays (UV) hardening, thereby forming the self-healing coating layer.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Some Reference Characters

| | |
|---|---|
| 10: Flexible display device | 100: Display panel |
| 115: Display panel adhesive layer | 120: Lower protective film |
| 125: TSP adhesive layer | 150: Touch screen panel |
| 175: Window adhesive layer | 210, 212, 214, 215: Base layer |
| 200, 202, 203, 204, 206, 207: Window substrate | |
| 230, 234, 235: Hard coating layer | 231: Coating tile |
| 250, 252, 253, 254, 256, 257: Self-healing coating layer | |

What is claimed is:

1. A flexible display device, comprising:
a display panel for displaying an image; and
a window substrate covering the display panel, the window substrate comprising:
  a flexible base layer comprising an externally facing first surface, and a second surface opposite the first surface and facing the display panel, the first surface spaced apart from the second surface in a first direction;
  a hard coating layer having a hardness that is larger than that of the base layer, and comprising a plurality of coating tiles on the first surface of the base layer that are spaced to have a gap between adjacent ones of the coating tiles, each of the coating tiles comprising an externally facing first surface that is spaced apart from the first surface of the base layer in the first direction; and
  a self-healing coating layer comprising a self-healing material, the self-healing coating layer covering the hard coating layer on the base layer and extending farther than the first surfaces of the adjacent ones of the coating tiles in a second direction opposite the first direction to extend into the gap.

2. The flexible display device of claim 1, further comprising a touch screen panel on the display panel.

3. The flexible display device of claim 1, further comprising a touch screen panel in the display panel.

4. The flexible display device of claim 1, wherein the coating tiles are isolated from each other.

5. The flexible display device of claim 1, wherein the plurality of coating tiles are arranged in a matrix form.

6. The flexible display device of claim 1, wherein the self-healing coating layer comprises an elastomer comprising at least one of silicones, urethanes, or urethane acrylates.

7. The flexible display device of claim 1, wherein the self-healing coating layer comprises a self-healing elastomer using hydrogen bonding or Diels-Alder reaction.

8. The flexible display device of claim 1, wherein the self-healing coating layer is patterned to individually cover each of the coating tiles.

9. The flexible display device of claim 1, wherein the base layer comprises protrusions patterned to correspond to respective ones of the coating tiles.

10. The flexible display device of claim 9, wherein the self-healing coating layer is formed to individually coat the protrusions on which the coating tiles are coated.

11. The flexible display device of claim 1,
wherein the window substrate corresponds to a display area for displaying an image, and a non-display area that encloses the display area, and
wherein the hard coating layer is at an area corresponding to the display area.

12. The flexible display device of claim 1, wherein a thickness of the coating tiles ranges from about 10 μm to about 100 μm.

13. The flexible display device of claim 1, wherein a thickness of the self-healing coating layer ranges from about 20 μm to about 50 μm.

14. The flexible display device of claim 1, further comprising a touch pen for touching a surface of the window substrate, wherein a curvature radius of a tip of the touch pen is r, wherein a thickness of the adjacent ones of the coating tiles is d, and wherein the gap between the adjacent ones of the coating tiles is S, the gap S satisfying the following equation:

$$S \leq 2\sqrt{d(2r-d)}$$

15. The flexible display device of claim 1, wherein the coating tiles have a circular or polygonal plane shape.

16. The flexible display device of claim 1, wherein the base layer comprises a material selected from at least one of elastomer, polyethylene terephthalate (PET), polyethylene naphthalate (PEN), polyimide (PI), polymethyl methacrylate (PMMA), silicone, or polyurethane (PU).

17. The flexible display device of claim 1, wherein the coating tiles comprise a material selected from at least one of epoxy, acryl, silicone, or polyurethane (PU).

18. A flexible display device, comprising:
a display panel for displaying an image; and
a window substrate covering the display panel, the window substrate comprising:
   a flexible base layer comprising an externally facing first surface, and a second surface opposite the first surface and facing the display panel;
   a hard coating layer having a hardness that is larger than that of the base layer, and comprising a plurality of coating tiles on the first surface of the base layer that are spaced to have a gap between adjacent ones of the coating tiles; and
   a self-healing coating layer comprising a self-healing material and covering the hard coating layer on the base layer,
   wherein the gap between the adjacent ones of the coating tiles ranges from about 20 μm to about 200 μm.

19. A flexible window substrate, comprising:
a flexible base layer comprising an externally facing first surface, and a second surface opposite the first surface, the first surface spaced apart from the second surface in a first direction;
a hard coating layer having a hardness that is larger than that of the base layer, and comprising a plurality of coating tiles on the first surface of the base layer that are spaced to have a gap between adjacent ones of the coating tiles, each of the coating tiles comprising an externally facing first surface that is spaced apart from the first surface of the base layer in the first direction; and
a self-healing coating layer comprising a self-healing material, the self-healing coating layer covering the hard coating layer on the base layer and extending farther than the first surfaces of the adjacent ones of the coating tiles in a second direction opposite the first direction to extend into the gap.

20. The flexible window substrate of claim 19, wherein the coating tiles are isolated from each other.

21. The flexible window substrate of claim 19, wherein the coating tiles are arranged in a matrix form.

22. The flexible window substrate of claim 19, wherein the self-healing coating layer comprises an elastomer comprising at least one of silicones, urethanes, or urethane acrylates.

23. The flexible window substrate of claim 19, wherein the self-healing coating layer comprises a self-healing elastomer using hydrogen bonding or Diels-Alder reaction.

24. The flexible window substrate of claim 19, wherein the self-healing coating layer is patterned to individually cover each of the coating tiles.

25. The flexible window substrate of claim 19, wherein the base layer comprises protrusions patterned to correspond to respective ones of the coating tiles of the hard coating layer.

26. The flexible window substrate of claim 25, wherein the self-healing coating layer individually coats the protrusions of the base layer on which the coating tiles are coated.

* * * * *